(12) United States Patent
Le Maitre et al.

(10) Patent No.: US 10,401,571 B2
(45) Date of Patent: Sep. 3, 2019

(54) OPTICAL SIGNAL SPLITTER

(71) Applicant: STMicroelectronics (Crolles 2) SAS, Crolles (FR)

(72) Inventors: Patrick Le Maitre, Biviers (FR); Jean-Francois Carpentier, Grenoble (FR)

(73) Assignee: STMicroelectronics (Crolles 2) SAS, Crolles (FR)

( * ) Notice: Subject to any disclaimer, the term of this patent is extended or adjusted under 35 U.S.C. 154(b) by 0 days.

(21) Appl. No.: 15/971,665

(22) Filed: May 4, 2018

(65) Prior Publication Data
US 2018/0329144 A1 Nov. 15, 2018

(30) Foreign Application Priority Data

May 12, 2017 (FR) .................................... 17 54200

(51) Int. Cl.
*G02B 6/28* (2006.01)
*G02B 6/12* (2006.01)
*G02B 6/125* (2006.01)

(52) U.S. Cl.
CPC ....... *G02B 6/2821* (2013.01); *G02B 6/12004* (2013.01); *G02B 6/125* (2013.01); *G02B 2006/12061* (2013.01); *G02B 2006/12097* (2013.01); *G02B 2006/12147* (2013.01); *G02B 2006/12159* (2013.01)

(58) Field of Classification Search
CPC .................................................. G02B 6/2821
USPC ........................................................ 385/24
See application file for complete search history.

(56) References Cited

U.S. PATENT DOCUMENTS

| 6,173,433 | B1 | 1/2001 | Katoh et al. |
| 6,282,343 | B1 | 8/2001 | Kim et al. |
| 2006/0072866 | A1 | 4/2006 | Mizuno et al. |
| 2010/0104237 | A1* | 4/2010 | Nasu ................. G02B 6/12007 385/11 |
| 2014/0169740 | A1 | 6/2014 | Verslegers et al. |
| 2014/0270628 | A1* | 9/2014 | Barwicz ................. G02B 6/126 385/14 |
| 2014/0325827 | A1 | 11/2014 | Lipson et al. |

(Continued)

OTHER PUBLICATIONS

Bogaerts et al., "Compact Single-Mode Silicon Hybrid Rib/Strip Waveguide With Adiabatic Bends," *IEEE Photonics Journal* 3 (3):422-432, Jun. 2011.

*Primary Examiner* — Jerry M Blevins
(74) *Attorney, Agent, or Firm* — Seed IP Law Group LLP

(57) ABSTRACT

The disclosure relates to an optical splitter including two waveguides on either side of an axis. Each waveguide includes a first segment and a second segment that are closer to the axis than the rest of the waveguide. The first segments are optically coupled and the second segments are optically coupled. Each guide includes between the first and second segment, starting from the first segment, a first curved section including in succession a curvature the concavity of which is turned the side opposite the axis then a curvature the concavity of which is turned towards the axis, and starting from the second segment a second curved section including in succession a curvature the concavity of which is turned the side opposite the axis then a curvature the concavity of which is turned towards the axis. The first curved sections of the two waveguides are curved differently.

16 Claims, 2 Drawing Sheets

(56) References Cited

U.S. PATENT DOCUMENTS

2015/0277042 A1 10/2015 Goodwill et al.
2016/0055122 A1 2/2016 Koranne

* cited by examiner

OPTICAL SIGNAL SPLITTER

BACKGROUND

Technical Field

The present application relates to the field of optoelectronic or optical devices, in particular to optoelectronic or optical chips, and more particularly relates to an optical signal splitter.

Description of the Related Art

In digital optical or optical communication applications, optoelectronic or optical chips are used to transmit or receive information in optical signal form. The wavelength of the optical signal corresponds to a standard value, for example 1310, 1490 or 1550 nm. In the chip, the signal is guided in a waveguide integrated into the chip, typically on a silicon substrate. After reception or before transmission, it may be desirable to split the optical signal into a plurality of signals guided in a plurality of waveguides.

FIG. 1 corresponds to FIG. 2 of patent application US 2014/0169740, and shows a splitter 100 of an optical signal IN.

The splitter 100 includes two waveguides 102A and 102B. In a central portion 104, the waveguides are closer to each other than in the rest of the splitter, and are optically coupled because of their proximity. On either side of the central portion, the waveguides include sections 106 that are each curved successively in two opposite directions. The sections 106 cause the waveguides to get further from each other until optically decoupled rectilinear sections 108 are reached.

An optical signal IN enters via the waveguide 102A and is split into two signals OUTA and OUTB that exit from the two waveguides. The waveguides are configured so that the intensity of the signal IN is equally distributed between the signals OUTA and OUTB.

In practice, the configuration of the splitter does not correspond exactly to the intended configuration, because of the imprecision and variability of the manufacturing process. The obtained signals OUTA and OUTB are then not of equal intensities. The difference between the obtained and desired intensities may be different for various splitters produced simultaneously by the same manufacturing process, or for various splitters produced by various implementations of the same manufacturing process.

The aforementioned patent application describes, in relation to FIG. 3A thereof, one solution to this problem. This solution has various drawbacks, such as problems with bulk and loss of optical signal intensity and problems with the implementation and sensitivity to imprecision of the manufacturing process.

Moreover, the wavelength of the optical signal may vary about the standard value, typically by plus or minus 10 nm. The division of or repartition of intensity between the signals OUTA and OUTB depends on wavelength, and this results, in known optical signal splitters, in an additional difference between the obtained and desired intensities. Typically a repartition of 45%/55% is obtained instead of the expected 50%/50%.

BRIEF SUMMARY

One embodiment makes provision to mitigate all or some of the drawbacks described above.

Thus, one embodiment makes provision for an optical signal splitter comprising two waveguides on either side of an axis, wherein each waveguide includes a first segment and a second segment that are closer to the axis than the rest of the waveguide, the first segments of the two waveguides being optically coupled and the second segments of the two waveguides being optically coupled; each waveguide includes between the first and second segment, starting from the first segment, a first curved section including in succession a curvature the concavity of which is turned the side opposite the axis then a curvature the concavity of which is turned towards the axis, and starting from the second segment a second curved section including in succession a curvature the concavity of which is turned the side opposite the axis then a curvature the concavity of which is turned towards the axis; and the first curved sections of the two waveguides are curved differently.

According to one embodiment, starting from the first segments of the two waveguides, the first curved sections of the two waveguides get further from the axis until reaching different distances from the axis.

According to one embodiment, the distances from the axis are different by between 15 and 40 nm.

According to one embodiment, at least one of the two waveguides includes a rectilinear section between the first curved section and the second curved section. According to one embodiment, the curved sections have a continuously varying radius of curvature and straight ends.

According to one embodiment, the curvatures of the curved sections each include a section of 3rd-order Bezier curve the starting control point of which is one of the ends of the curvature and the two intermediate control points of which are coincident and located on an axis that is tangent to the curvature at the starting control point.

According to one embodiment, each curvature furthermore includes a circular arc that joins the Bezier curve and matches the curvature of the Bezier curve; and each curvature is symmetric with respect to the axis of symmetry of the circular arc.

According to one embodiment, each waveguide is symmetric with respect to an additional axis that is orthogonal to the axis.

According to one embodiment, each of the curved sections is symmetric with respect to its center.

According to one embodiment, the waveguides are made of silicon surrounded by silicon oxide.

According to one embodiment, the waveguides each include, on a slab of thickness included between 110 and 130 nm, a central ridge of width included between 310 and 330 nm, the thickness of the waveguide being included between 300 and 320 nm.

According to one embodiment, the wavelength of the optical signal is 1310, 1490 or 1550 nm.

One embodiment provides an optical communication chip comprising a splitter such as above.

BRIEF DESCRIPTION OF THE SEVERAL VIEWS OF THE DRAWINGS

These features and advantages, and others, will be described in detail in the following non-limiting description of particular embodiments, which is given with reference to the appended figures, in which.

DETAILED DESCRIPTION

The various figures have not been drawn to scale and, in addition, in the various figures, elements that are the same have been referenced by the same references. For the sake of clarity, only those elements which are useful to the comprehension of the described embodiments have been shown and are described in detail.

In the following description, when reference is made to qualifiers of position, such as the terms "left" and "right," etc., reference is being made to the orientation of the element in question in the figures in question. Unless otherwise specified, the expression "about" means to within 10% and preferably to within 5%.

Figure 1:
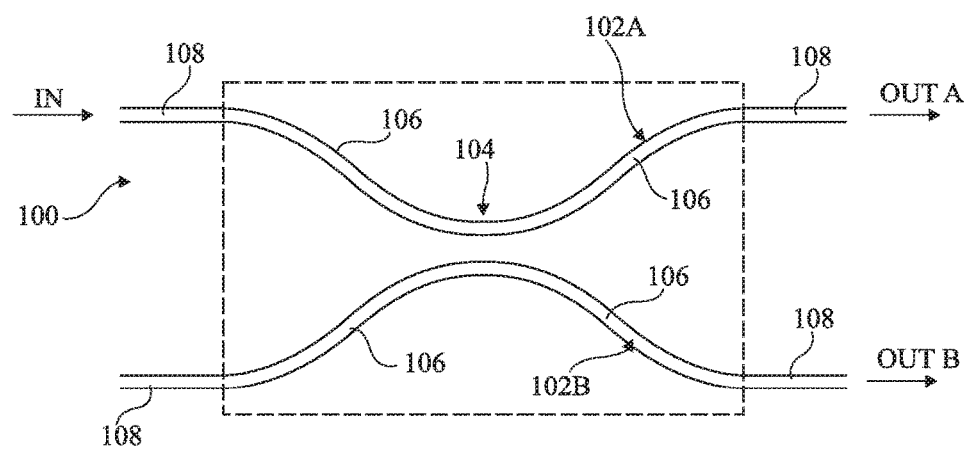
FIG. 1 shows a conventional optical signal splitter.
Figure 2A:
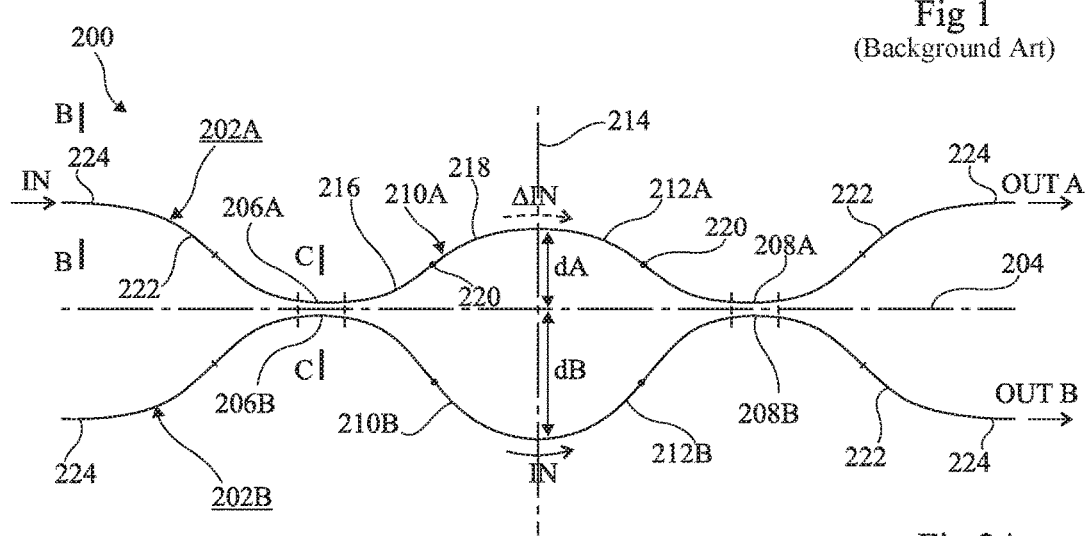
FIG. 2A is a schematic top view of one embodiment of an optical signal splitter according to one embodiment of the present disclosure.

FIG. 2A is a schematic top view of one embodiment of an optical signal splitter 200. The optical signal splitter 200 includes two waveguides 202A and 202B on either side of an axis 204. Only a median line of each of the waveguides has been shown. The structure of the waveguides on either side of their median lines will be described in more detail with reference to FIGS. 2B and 2C.

Each waveguide includes two segments 206A and 208A for the waveguide 202A and 206B and 208B for the waveguide 202B, which are closer to the axis than the rest of the waveguide. The segments 206A, 206B, 208A and 208B are preferably rectilinear. The segments 206A and 206B are parallel and symmetric with respect to the axis 204, and are optically coupled because of their proximity. The segments 208A and 208B are parallel and symmetric with respect to the axis 204, and are optically coupled because of their proximity.

Between the segments 206A and 208A, the waveguide 202A includes:
  starting from the segment 206A, a curved section 210A including in succession a curvature 216 the concavity of which is turned the side opposite to the axis then a curvature 218 the concavity of which is turned towards the axis; and
  starting from the segment 208A, a curved section 212A including in succession a curvature 216 the concavity of which is turned the side opposite to the axis then a curvature 218 the concavity of which is turned towards the axis.

Between the segments 206B and 208B, the waveguide 202B includes:
  starting from the segment 206B, a curved section 210B including in succession a curvature 216 the concavity of which is turned the side opposite to the axis then a curvature 218 the concavity of which is turned towards the axis; and
  starting from the segment 208B, a curved section 212B including in succession a curvature 216 the concavity of which is turned the side opposite to the axis then a curvature 218 the concavity of which is turned towards the axis.

By way of example, each waveguide is symmetric with respect to an axis 214 that is orthogonal to the axis 204. By way of example, the oppositely directed curvatures, 216 and 218, of each curved section are symmetric with each other with respect to the center 220 of the curved section.

Moreover, each waveguide includes, beyond the portion between segments 206A, 206B and 208A, 208B, curved sections 222 of successive, oppositely directed curvatures. Starting from each segment, the curved sections 222 cause the waveguide to get further from the axis 204 until optically decoupled sections 224, which are for example rectilinear and parallel to the axis 204, are reached.

It is proposed here that the curved sections 210A and 210B be curved differently, i.e., that the curved sections have an asymmetry therebetween with respect to the axis 214.

The waveguide 202A is intended to receive an optical signal IN via the section 224 connected to the segment 206A, in the left-hand portion of the figure. The waveguides are configured level with the segments 206A and 208A so that for example 100% of the optical signal passes from the waveguide 202A to the waveguide 202B. Provision is thus made for the right-hand half of the splitter to receive the signal IN via the waveguide 202B. The waveguides are configured level with the segments 208A and 208B so that the optical signal IN is then split into two for example equal portions OUTA and OUTB that exit from the right-hand portion of the splitter in respective waveguides 202A and 202B.

In practice, because of imprecisions and variability in the manufacturing process, the configuration of the waveguides differs from the expected configuration. Furthermore, the wavelength of the signal may differ from the standard value. As discussed in the preamble, for these reasons, the signal IN entering into the right-hand portion via the waveguide 202B is then not divided into two equal portions. However, for the same reasons, the signal IN entering into the left-hand portion via the waveguide 202A is not transferred 100% to the waveguide 202B in the left-hand portion. A portion ΔIN remains in the waveguide 202A and enters into the right-hand portion via this waveguide.

Because the curved sections of the waveguides between the coupled segments are curved differently, the signals ΔIN and IN have a phase difference at their entrance into the segments 208A and 208B. Specifically, the provision of differently curved sections leads to a difference in the length of the waveguides 202A and 202B between the optically coupled segments and/or to a difference in effective refractive index. The curved sections of the waveguides are designed so that interference between the signals ΔIN and IN level with the segments 208A and 208B decreases the difference between the intensities of the signals OUTA and OUTB. This is possible for various implementations of the manufacturing process because imprecisions and variability in the process have correlated and similar effects in the right-hand and left-hand halves of the splitter, and the intensity of the signal ΔIN increases as the difference to be decreased increases.

By way of example, the curved sections 210A and 210B get further from the axis 204 starting from the segments 206A and 206B until reaching different distances from the axis, dA and dB, respectively. The difference between the distances dA and dB is for example chosen to create a phase difference between the signals ΔIN and IN of $\pi + 2 \cdot n \cdot \pi$, where n is an integer preferably equal to 0.

The optically coupled segments and the curved sections may be configured by numerical modelling. By way of example, the configuration used is chosen from a set of predefined configurations. In each predefined configuration, each curved section and each coupled segment is defined by a set of parameters such as angles, lengths, and radii of curvature, examples of which are described below with reference to FIG. 4. For each predefined configuration, the operation of the splitter is simulated by a numerical model that it is within the capabilities of a person skilled in the art to produce. For each predefined configuration, the simulation is repeated for the various configurations that will in practice be obtained on account of the imprecisions and variability in the manufacturing process, and for various wavelengths of the optical signal in the interval for example of plus or minus 15 nm about the expected wavelength. The predefined configuration that yields the smallest difference between the signals OUTA and OUTB is then chosen. According to one advantage, the difference between the obtained and desired repartition of the intensity of the signals OUTA and OUTB is particularly small whatever the wavelength in the aforementioned interval. Furthermore, this difference is particularly small for various implementations of the manufacturing process.

Figure 3:
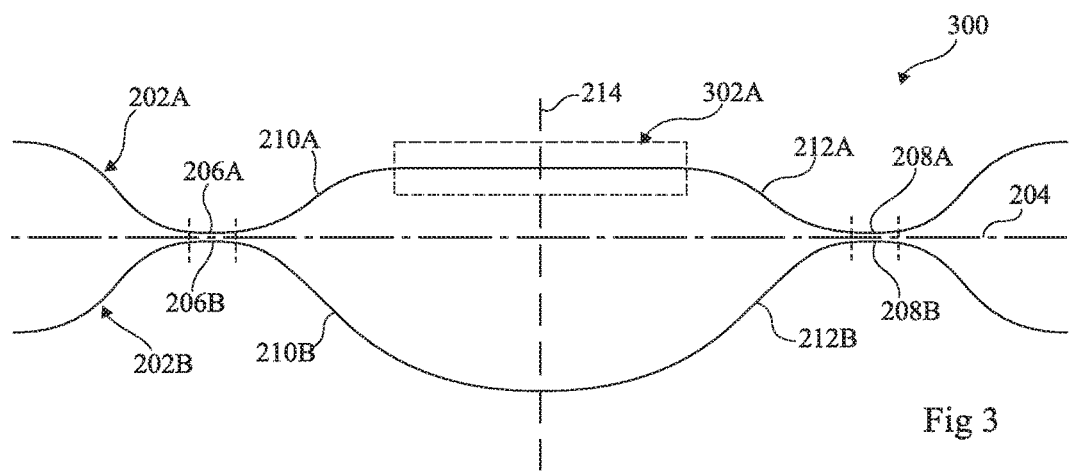
FIG. 3 is a schematic top view of another embodiment of an optical signal splitter according to the present disclosure.

According to another advantage, each of the waveguides includes between the optically coupled segments only two curved sections of successive, oppositely directed curvatures, in contrast to known signal splitters such as that of FIG. 3 of the aforementioned patent application US 2014/0169740. This makes it possible to further limit the effect of imprecisions and variability in the manufacturing process on the repartition of intensity between the signals OUTA and OUTB. This advantage is reinforced because the two waveguides have the same number of curved sections arranged similarly on either side of the axis. Specifically, the effects of process imperfections and variability on the two waveguides then partially cancel out.

According to another advantage, each of the waveguides includes, between the entrance and exit of the splitter, only four curved sections of successive, oppositely directed curvatures. This results in a particularly compact splitter, because the space required to produce these sections is limited. Furthermore, the curved sections 210A and 212A on the one hand, and 210B and 212B on the other hand, may be joined directly to each other.

According to another advantage, because each of the waveguides may include, between the entrance and exit of the splitter, only four curved sections of successive, oppositely directed curvatures, the loss of optical signal intensity is particularly low. Specifically, most of the loss of optical signal occurs in the curved sections.

According to another advantage, because each of the waveguides includes, between the entrance and exit of the splitter, only four curved sections of successive, oppositely directed curvatures, the numerical modelling is particularly simple to do.

Figure 2B:
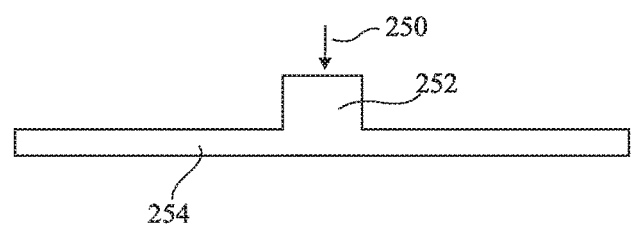
FIGS. 2B and 2C are schematic cross-sectional views of the optical signal splitter of FIG. 2A according to embodiments of the present disclosure.
Figure 2C:
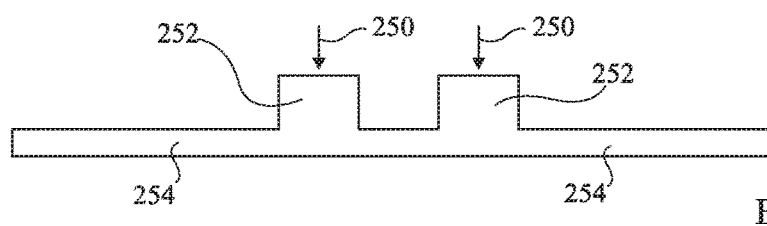

FIGS. 2B and 2C are examples of schematic cross-sectional views of two portions of the optical signal splitter of FIG. 2A. FIG. 2B shows a not optically coupled portion of a waveguide, and FIG. 2C shows optically coupled segments of two waveguides.

By way of example, each waveguide is made of silicon and is surrounded by silicon oxide. Each waveguide extends symmetrically on either side of the median line the position of which is indicated by an arrow 250. Each waveguide includes a central ridge 252 on a slab 254. By way of example, the slab has, depending on the intended application, a thickness included between 50 and 160 nm and generally 160 nm. The width of the slab 254 is for example included between 2 and 5 µm. The total thickness of the ridge and slab is for example included between 300 and 320 nm and is preferably 310 nm. The width of the ridge depends on the wavelength of the signal and the thickness of the slab, and is for example included between 310 and 450 nm and is preferably 320 nm.

Where optically coupled, the waveguides have an inter-ridge edge-to-edge distance for example of between 200 and 300 nm and preferably of 250 nm for a wavelength of 1310 nm. The slabs 254 of the two waveguides then form a common slab.

FIG. 3 illustrates another embodiment of an optical signal splitter 300. The splitter 300 corresponds to the splitter 200 of FIG. 2A, but the waveguide 202A includes a rectilinear section 302A parallel to the axis 204, between the curved sections 210A and 212A.

According to one advantage, with respect to the splitter 200 of FIG. 2A, a larger difference in the lengths of the guides is obtained between the coupled segments, thereby allowing larger phase shifts between the signals ΔIN and IN, and greater variations in this phase shift as a function of wavelength. The curved sections may thus be adjusted so that the intensities of the signals OUTA and OUTB correspond to the desired intensities and are independent of variations in wavelength about the standard wavelength.

By way of variant (not shown), provision will also possibly be made for the waveguide 202B to furthermore include a rectilinear section between the sections 210B and 212B.

Figure 4:
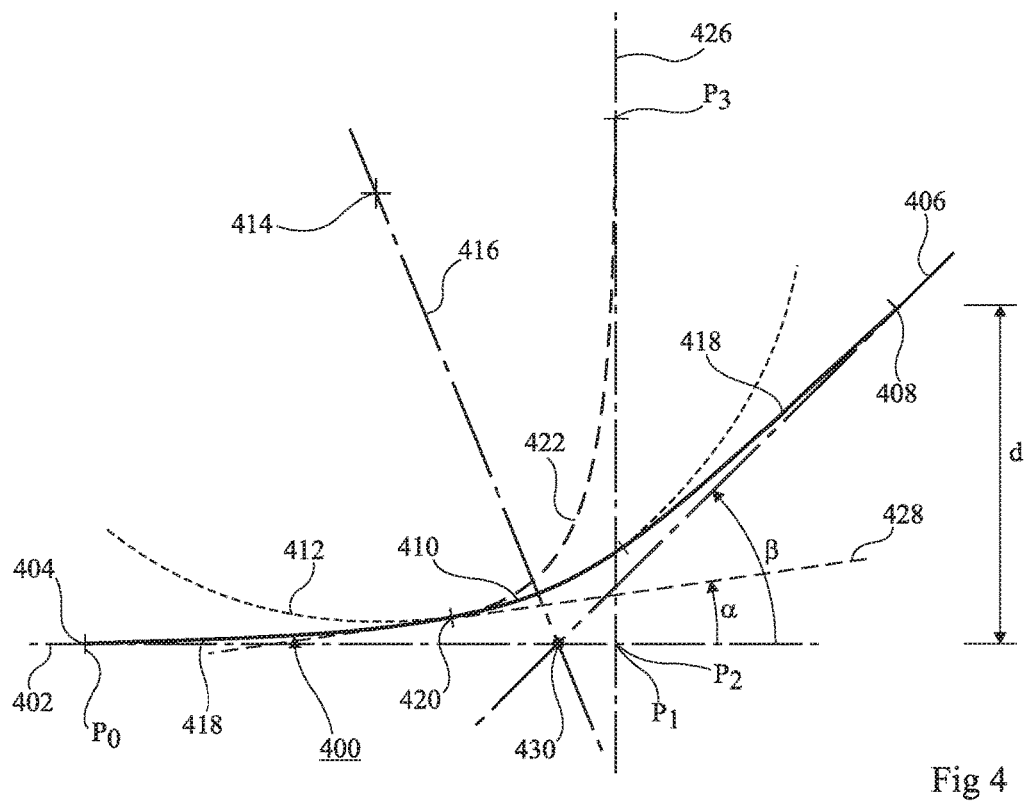
FIG. 4 is a schematic top view of an exemplary curvature of a waveguide of one embodiment of an optical signal splitter according to the present disclosure.

FIG. 4 is a schematic top view of an example of a curvature 400 of a waveguide of the splitter 200 of FIG. 2A or 300 of FIG. 3. The median line of the waveguide is shown. The curvature 400 may be one of the curvatures 216, 218 of the curved sections 210A, 210B, and 212A, 212B.

The curvature 400 makes the waveguide pass from an orientation along an axis 402 at a point 404 to an orientation along an axis 406 at a point 408. Each end point 404 or 408 is for example an end point of another curvature of the same type as the curvature 400 or of a rectilinear section of the waveguide, for example one of the coupled segments.

The curvature 400 includes in a central portion an arc 410 of a circle 412, of center 414. By way of example, the curvature 400 is symmetric with respect to the axis 416 of the circular arc 410. On either side of the arc 410, each end point 404, 408 is connected by a section 418 of curve that starts off from the end point being straight, i.e., with an infinite radius of curvature at the end point, and that gradually curves to join the arc and match the curvature of the circle at a point 420. By way of example, the curvature 400 is a 3rd-order Bezier curve 422 the starting control point P0 of which is located at the end point 404, the successive intermediate control points P1 and P2 of which are coincident and located on the axis 402, and the arrival control point P3 of which is located on an axis 426 that passes through the points P1 and P2 and that, for example, is orthogonal to the axis 402. Specifically, because the points P1, P2 and P3 are aligned, the section 418 of Bezier curve 422 is straight at the starting point 404. By way of example, the points P0 and P3 are the same distance from the point P1, P2. By way of variant, the points P1, P2 and P3 may be aligned in any other way suitable for obtaining a section of curve that gradually curves to join the circular arc and match the curvature of the circle.

Because the radius of curvature of each Bezier curve varies continuously and because each Bezier curve and the circular arc have the same radius of curvature where they join, the radius of curvature varies continually from the end point 404 to the end point 408. Because the curvatures of the waveguides furthermore have straight ends, the radius of curvature varies continuously along the waveguide.

According to one advantage, any abrupt change in radius of curvature, liable to cause reflection, back propagation and the loss of some of the optical signal, is thus avoided. The device is then particularly low-loss.

Moreover, at the point 420, the waveguide has a direction 428 making an angle α to the axis 402. The angle α, the angle β between the axis 406 and the axis 402, and the distance d between the axis 402 and the point 408 are three parameters that define the curvature 400 from the point 404 and from the axis 402. In order for the curved sections to be curved differently in the two waveguides, different parameters α, β and/or d may be chosen for these curved sections.

By way of example, the radius of the circle 412 is included between 50 μm and 60 μm and is for example 40 μm. The angle α is for example included between 0 and 45°. The angle β is for example included between 5 and 45°.

By way of example, identical angles β may be chosen for the two curved sections, for example an angle of 10°. Provision may then be made for the circles 412 of the curved sections to have different radii, for example by about 50 μm, in order to obtain a difference between the distances dA and dB to the axis for example included between 40 to 80 nm (these distances were mentioned above with reference to FIG. 2). In another example, the circles 412 of the curved sections may be chosen to have the same radii, for example of 50 μm. Provision may then be made for the angles β to be different in order to obtain a difference between dA and dB included between 100 and 250 nm.

By way of variant, the particular curvature 400 may be replaced by any curvature with straight ends and a continuously varying radius of curvature. For example, the circular arc 410 may be omitted, and the curvature may be formed from a single Bezier curve the intermediate control points P1 and P2 of which are coincident with the point 430 where the axes 402 and 406 meet, and the starting control point P0 and arrival control point P3 of which are the points 404 and 408, respectively.

Particular embodiments have been described. Various variants and modifications will be apparent to those skilled in the art. In particular, curved sections comprising oppositely directed curvatures that were symmetric with respect to the center of the curved section have been described. Each curved section may not be symmetric with respect to its center, and may include, for example, two curvatures of the same type as the curvature 400 of FIG. 4, each defined by different parameters α, β and d.

Furthermore, although the described curved sections include two curvatures that were of the same type as the curvature 400 and that were joined by their ends, each curved section may include a rectilinear section between the two curvatures. Thus, the curved sections of the two waveguides may be curved differently because of the presence of such a rectilinear portion in a single one of the curved sections, or of the presence of rectilinear portions of different lengths in the curved sections.

In the described embodiments, provision was made for a left-hand portion that caused 100% of the signal to pass from one waveguide to the other, followed by a right-hand portion that split 100% of the signal into two equal portions, thereby allowing signals OUTA and OUTB of equal intensities to be obtained. However, signals OUTA and OUTB of equal intensity will possibly be obtained by making provision for any suitable way of distributing the input signal IN between the waveguides of the left-hand portion and then the signals of each of the waveguides. In particular, the left-hand portion will possibly be used to split the signal IN into two equal portions, and the right-hand portion will possibly be used to transfer 100% of the signal from each waveguide to the other waveguide. Furthermore, although, by way of example, the two signals OUTA and OUTB described here were of equal intensities, provision may also be made for the signals OUTA and OUTB to have any desired repartition different from 50%/50%.

In addition, provision may be made, in practice, in the described embodiments, for each curvature to be formed by a succession of rectilinear parts that follow the curvature with a precision for example lower than that of the manufacturing process, for example lower than 1 nm.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An optical signal splitter comprising two waveguides on either side of an axis, wherein:
    each waveguide includes a first segment and a second segment that are closer to the axis than the rest of the waveguide, the first segments of the two waveguides being optically coupled and the second segments of the two waveguides being optically coupled;
    each waveguide includes between the first and second segment, starting from the first segment, a first curved section including in succession a curvature the concavity of which is turned the side opposite the axis then a curvature the concavity of which is turned towards the axis, and starting from the second segment a second curved section including in succession a curvature the concavity of which is turned the side opposite the axis then a curvature the concavity of which is turned towards the axis and wherein the first curved sections of the two waveguides are curved differently; and
    wherein curvatures of the first and second curved sections each comprise a section of a 3rd-order Bezier curve, a starting control point being one of the ends of the curvature of the curved section and two intermediate control points being coincident and located on an axis that is tangent to the curvature of the curved section at the starting control point.

2. The optical splitter according to claim 1 wherein, starting from the first segments of the two waveguides, the first curved sections of the two waveguides get further from the axis until reaching different distances from the axis.

3. The optical splitter according to claim 2 wherein the distances from the axis are different by between 15 and 40 nm.

4. The optical splitter according to claim 1 wherein at least one of the two waveguides comprises a rectilinear section between the first curved section and second curved section.

5. The optical splitter according to claim 1 wherein:
    each of the curvatures further includes a circular arc that joins the Bezier curve and matches a curvature of the Bezier curve; and
    each of the curvatures is symmetric with respect to an axis of symmetry of the circular arc.

6. The optical splitter according to claim 1 wherein each waveguide is symmetric with respect to an additional axis that is orthogonal to the axis.

7. The optical splitter according to claim 1 wherein each of the curved sections is symmetric with respect to a center.

8. The optical splitter according to claim 1 wherein the two waveguides are made of silicon surrounded by silicon oxide.

9. The optical splitter according to claim 1 wherein the two waveguides each comprise, on a slab of thickness comprised between 110 and 130 nm, a central ridge of width comprised between 310 and 330 nm, wherein a total thickness including a thickness of the central ridge and the thickness of the slab being comprised between 300 and 320 nm.

10. The optical splitter according to claim 1 wherein the optical splitter is configured to propagate an optical signal having a wavelength of one of 1310, 1490 and 1550 nm.

11. An optical signal splitter, comprising:
a first waveguide and a second waveguide, the first waveguide being formed on a first side of an axis and the second waveguide being formed on a second side of the axis opposite the first side, each of the first and second waveguides including:
a first segment and a second segment positioned closer to the axis than a remainder of the waveguide, the first segments of the first and second waveguides being optically coupled to one another and the second segments of the first and second waveguides being optically coupled one another;
a first curved section extending from the first segment towards the second segment, the first curved section including a first curvature starting from the first segment and having a concavity opposite the axis and the first curved section including a second curvature starting from the first curvature and having a concavity towards the axis; and
a second curved section extending from the second segment towards the first curved section, the second curved section including a third curvature starting from the second segment and having a concavity opposite the axis and the second curved section including a fourth curvature starting from the third curvature and having a concavity towards the axis, the second curved section having the fourth curvature being coupled to the first curved section having the second curvature at an orthogonal distance from the axis, wherein the orthogonal distance for the first waveguide is different than the orthogonal distance for the second waveguide; and
wherein the first, second, third and fourth curvatures of the first and second curved sections each includes a portion defined by a 3rd-order Bezier curve.

12. The optical splitter of claim 11, wherein the orthogonal distances of the first and second waveguides are different by between 15 and 40 nm.

13. The optical splitter of claim 11, wherein the second curvature of the first curved section is a rectilinear portion of the first curved section that is parallel to the axis, and wherein the fourth curvature of the second curved section is a rectilinear portion of the second curved section that parallel to the axis.

14. A method of splitting an optical signal, comprising:
propagating the optical signal in a first waveguide positioned on one side of an axis with a second waveguide positioned on an opposite side of the axis;
propagating the optical signal in the first waveguide through a first curved section of the first waveguide that is coupled between first and second segments of the first waveguide, the first curved section being positioned farther from the axis than first and second segments positioned proximate the axis, the first curved section having a first length, the propagating the optical signal in the first waveguide through the first curved section of the first waveguide includes propagating the optical signal through first and second portions of the first curved section having curvatures defined by a defined by a 3rd-order Bezier curve;
coupling the optical signal in the first waveguide into the second waveguide at first and second segments of the second waveguide that are positioned proximate the axis opposite the first and second segments, respectively, of the first waveguide; and
propagating the optical signal coupled into the second waveguide through a first curved section of the second waveguide that is coupled between the first and second segments of the second waveguide, the first curved section of the second waveguide being positioned farther from the axis than first and second segments of the second waveguide and the first curved section of the second waveguide having a second length that is different than the first length of the first curved section of the first waveguide.

15. The method of claim 14, wherein propagating the optical signal coupled into the second waveguide comprises propagating the optical signal coupled into the second waveguide through first and second portions of the first curved section of the second waveguide having continuously varying radiuses of curvature and opposite concavities relative to the axis.

16. The method of claim 14, wherein propagating the optical signal in the first waveguide through the first curved section of the first waveguide comprises propagating the optical signal through a rectilinear portion of the first curved section.

* * * * *